United States Patent [19]

Besik

[11] 4,421,648
[45] Dec. 20, 1983

[54] APPARATUS AND A METHOD FOR BIOLOGICAL TREATMENT OF WASTE WATERS

[76] Inventor: Ferdinand Besik, 3243 Chokecherry Crs., Mississauga, Ontario, Canada, L5L 1B1

[21] Appl. No.: 268,725

[22] Filed: Jun. 1, 1981

[51] Int. Cl.³ .............................................. C02F 3/08
[52] U.S. Cl. .................................... 210/605; 210/608; 210/617; 210/619; 210/628; 210/629; 210/151; 210/138; 210/195.1; 261/92
[58] Field of Search ............... 210/605, 615, 617, 619, 210/620–626, 629, 150, 151, 324, 325, 195.1, 205, 219, 220, 221.3, 400, 401, 628, 608, 138; 261/80, 92

[56] References Cited
U.S. PATENT DOCUMENTS

| 563,811 | 7/1896 | Scowden | 210/150 |
|---|---|---|---|
| 798,908 | 9/1905 | Kremer | 210/150 |
| 1,799,299 | 4/1931 | Johnston | 210/400 |
| 1,971,796 | 8/1934 | Scott | 210/629 |
| 3,980,556 | 9/1976 | Besik | 210/903 |
| 4,008,159 | 2/1977 | Besik | 210/903 |
| 4,026,802 | 5/1977 | Akae | 210/151 |
| 4,153,430 | 5/1979 | Cheng et al. | 261/92 |
| 4,188,289 | 2/1980 | Besik | 210/626 |
| 4,271,026 | 6/1981 | Chen et al. | 210/605 |

Primary Examiner—Peter A. Hruskoci

[57] ABSTRACT

An apparatus and a method for biological treatment of waste waters achieving biological oxidation of organic matter, biological nitrification and denitrification of nitrogenous compounds and biological removal of phosphorus and clarification of the treated waste water in a single reaction tank in a single suspended growth sludge system without the use of traditional compressors, mixers, recirculation pumps, piping and valving and without the use of the traditional clarifier.

13 Claims, 2 Drawing Figures

APPARATUS AND A METHOD FOR BIOLOGICAL TREATMENT OF WASTE WATERS

FIELD OF INVENTION

This invention relates to a system for biological removal of carbonaceous, nitrogenous and phosphorous compounds and suspended solids from waste waters and has for its object a provision of an apparatus capable of an efficient, reliable and unattended maintenance free operation at minimum capital, operational costs and consumption of energy.

BACKGROUND TO THE INVENTION

Overfertilization of surface waters and degradation of potable water sources in densely populated areas led to pollution control regulations calling for removal of nutrients in the treatment of municipal and industrial waste waters. Consequently, in the biological treatment of waste waters attention is being focused on single-sludge suspended growth system combining the processes of carbon oxidation, nitrification, denitrification and removal of phosphorus in one or more reactors without the intermediate clarification and without the addition of external carbon source for denitrification and without addition of chemicals for removal of phosphorus.

It is known, that for a high rate biological removal of carbonaceous, nitrogenous and phosphorous compounds in a single sludge system it is necessary to maintain: (a) a high concentration of mixed microbial population in the biochemical reactor, (b) an efficient contact of the mixed microbial population with the incoming waste water, (c) an efficient mixing of the partially treated waste water with the incoming waste water and with the mixed microbial population for a short period without the dissolved oxygen being present in the reactor mixed liquor and for a short period with the dissolved oxygen being present in the reactor mixed liquor, and (d) a controlled withdrawal of the excess sludge.

To comply with the above process requirements, the current treatment systems utilize biochemical reactors that require compressors and/or surface aerators for mixing and aerating the reactor mixed liquor in the aerobic reaction zones, mechanical mixers for mixing of the reactor mixed liquor in the anoxic zones, pumps for recirculating the reactor mixed liquor between individual zones and clarifiers that require sludge mixers or sludge scrapers and sludge return pumps, piping and valving etc. that make the treatment system operational, but complex and expensive and requiring considerable maintenance.

Therefore, it is the object of this invention to provide an efficient treatment system in which all of the above process requirements could be met and the biological reactions could be carried out reliably at minimum cost and at minimum consumption of energy.

More particularly, it is the object of this invention to provide a biochemical reactor that would provide and reliably maintain the conditions required for a high rate biooxidation of carbonaceous compounds, biological nitrification and denitrification and biological uptake of phosphorus in a single reactor and a single suspended growth sludge system.

It is also the object of this invention to provide a simple and maintenance free biochemical reactor with high energy utilization efficiency in mixing, recirculating and aerating of the reactor mixed liquor without the use of the traditional compressors, surface aerators, mixers and recirculation pumps, that could be constructed from concrete, steel, fiber glass and or other suitable material.

Another object of this invention is to combine the biochemical reactor with a clarifier into a simple treatment system not requiring compressors, pumps, surface aerators, mixers, piping, etc. for reliable operation, that could be easy to scale up or down for use in standardized package plants.

It is another object of this invention to provide a treatment system that would be capable to operate reliably with high concentration of powdered minerals, activated carbon, saw dust, or their mixtures present in the system.

Another object of this invention is to provide a system for biological treatment of waste waters capable of cyclic "on-off" operation to permit optimum utilization of energy at batch-wise flow conditions occuring in small package plants and particularly in single house sewage treatment systems.

Other objects and features of the invention will be understood from the accompanying drawings and the following description of claims.

SUMMARY OF THE INVENTION

The present invention provides a biochemical reactor with a new type of mixing of the reactor content permitting operation of the reactor with high concentration of mixed liquor suspended solids, permitting formation of anoxic and aerobic zones within a single reaction tank and providing all process conditions required for biooxidation of carbonaceous material, biological nitrification and denitrification and biological uptake of phosphorus in a single suspended growth sludge system.

The present invention provides a new type of transport of the reactor mixed liquor between the anoxic and aerobic zones automatically formed in the reactor, provides a new type of delivery and dispersion of the air into the reactor mixed liquor, provides a new type of mixing in the formed anoxic and oxic zones thus eliminating the need for the traditional compressors, air diffusers, surface aerators, mixers, pumps and the associated piping and valving.

The present invention permits integration of the biochemical reactor with a clarifier into a treatment system that does not require the traditional sludge return pumps, air lifts, sludge mixers or scrapers, mechanical or air operated skimmers and the associated piping and valving. The treatment system of this invention is therefore simple, its operation reliable, the capital and operational costs reduced and the traditional maintenance eliminated.

The biochemical reactor of this invention with minor adjustment can be also used with the various activated sludge process modifications and the existing activated sludge treatment plants can be modified to utilize the benefits of this invention to reduce maintenance and operational costs, to improve the treatment efficiency and to increase the plant performance.

BRIEF DESCRIPTION OF THE DRAWINGS

The forgoing and other objects and advantages of the present invention will become apparent from the following detailed description which proceeds with reference to the accompanying drawings wherein.

DESCRIPTION OF THE PREFERED EMBODIMENT

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
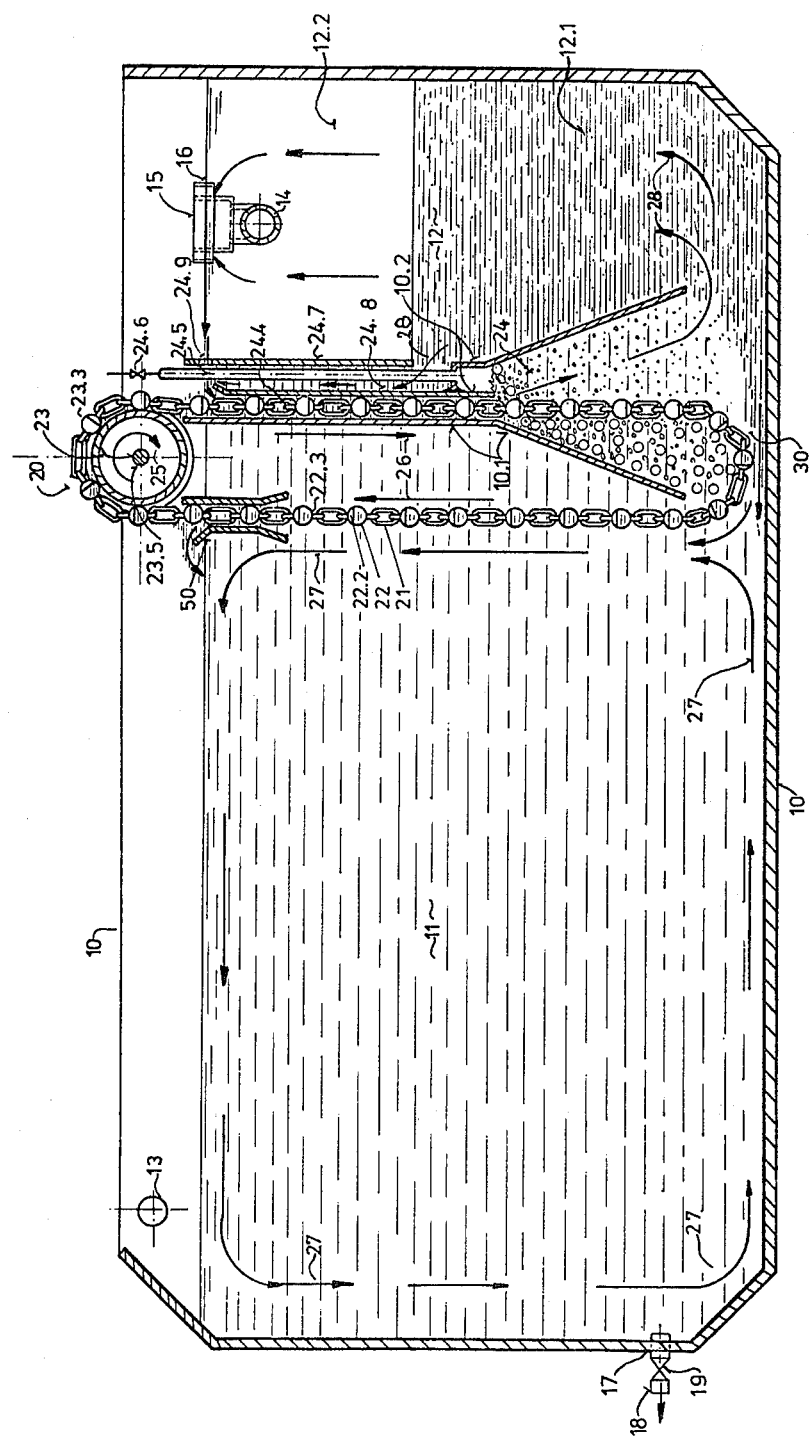
FIG. 1 is a vertical view through one prefered embodiment of the biochemical reactor of this invention.
Figure 2:
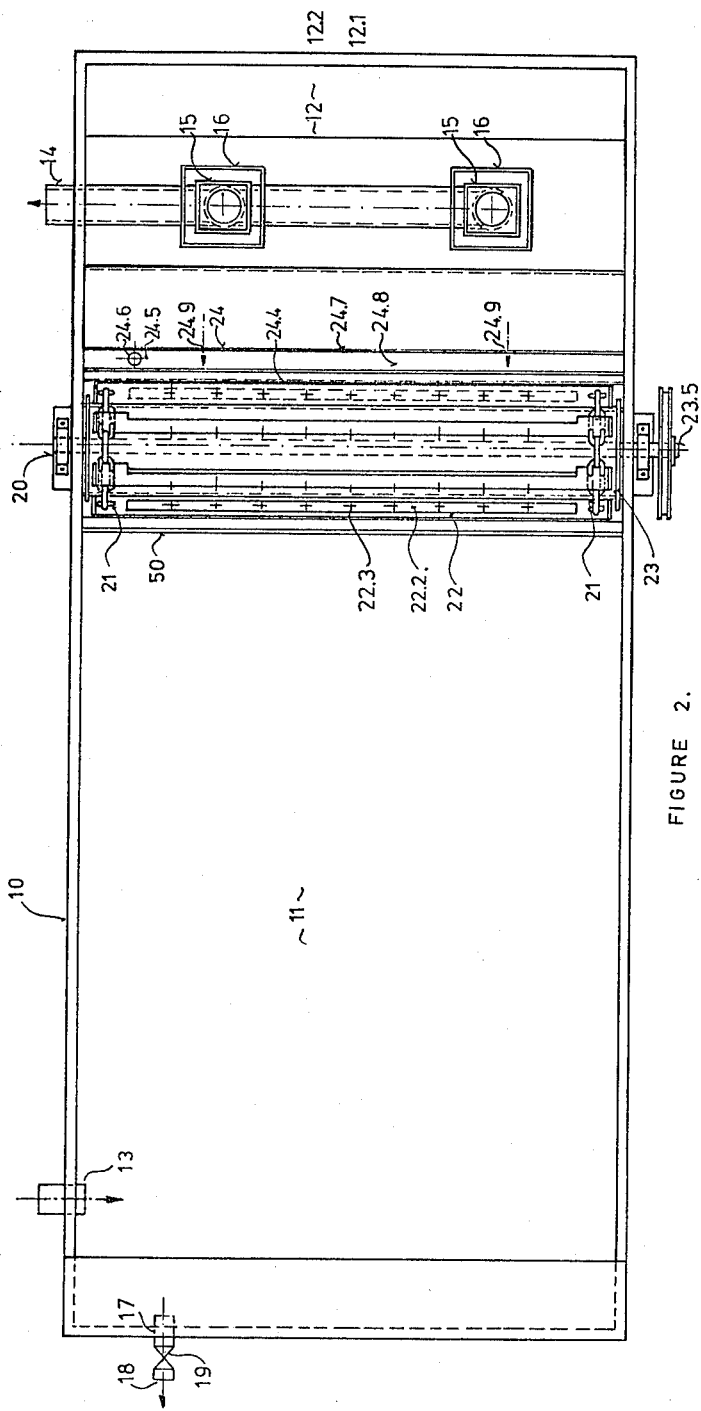
FIG. 2 is a plan view of the biochemical reactor of FIG. 1.

Reference is made first to FIGS. 1 and 2 for an explanation of one preferred modification of the apparatus of the present invention. As is there shown, the apparatus comprises a reaction tank 10 equipped with an inlet 13, the first solid wall partition 10.1, the second solid wall partition 10.2, the baffle 24.7 with openings 24.9, a multifunctional device 20 comprising an endless vertical belt 21 with horizontal chambers 22, the belt 21 being supported by a drum 23 mounted on a shaft 23.5, a standpipe 24.5 with valve 24.6, the throat 50, the weir 15 equipped with baffles 16, the effluent exit pipe 14 and the excess sludge withdrawal pipe 18 equipped with valve 19. It should be apparent that the belt 21 can be constructed using various types of chains and can be supported by sprockets mounted on the shaft 23.5 instead of the shown drum 23 to achieve the same results.

The first solid wall partition 10.1 is positioned inside the endless vertical belt 21 and is attached to two side walls of the reaction tank 10 separating the reaction tank 10 into first reaction zone 11 and second reaction zone 12. The second partition 10.2 is positioned in parallel with first partition 10.1 alongside the vertical belt 21 and is attached to two side walls of said reaction tank 10. The top of said second partition 10.2 is submerged in the liquid held in the second reaction zone 12, the lower portion of partition 10.2 is arranged diagonally in second reaction zone 12 to form with partition 10.1 a funnel shaped aeration zone 24 located between first partition 10.1, second partition 10.2 and the two side walls of the reaction tank 10. The first reaction zone 11 and the second reaction zone 12 are in communication with each other under the aeration zone 24 via opening 30 formed by the bottoms of first partition 10.1 and second partition 10.2 and the two side walls and bottom of the reaction tank 10. The endless belt 21 is moving around first partition 10.1 and downwardly in the channel 24.4 formed between first partition 10.1 and second partition 10.2 and upwardly in first reaction zone 11. A vertical baffle 24.7 is located in parallel with partition 10.2 and is attached to the two side walls of the reaction tank 10. The top of the baffle 24.7 extends above the level of the liquid held in the second reaction zone 12, the bottom of baffle 24.7 is positioned at the top level of the fluidized bed 12.1 of sludge maintained in second reaction zone 12. The partition 10.2 and the baffle 24.7 form a channel 24.8 for recirculation of the sludge from the top of the fluidized bed 12.1 upwardly in channel 24.8, then downwardly in channel 24.4, then downwardly through the aeration zone 24 to the bottom of reaction tank 10, then upwardly in the direction of arrows 28 through the fluidized bed of sludge 12.1. The baffle 24.7 and the three side walls of the reaction tank 10 form a clear well zone 12.2 positioned above the fluidized bed 12.1 in the reaction zone 12 from which clear well the treated and clarified waste water is flowing via weir 16 and pipe 14 out of the reaction tank 10 and the floating solids accumulated in the clear well 12.2 are skimmed and returned via openings 24.9 into the aeration zone 24.

When drum 23 rotates in the direction shown by arrow 25 the belt 21 with chambers 22 moves in the direction shown by arrows 26. The rotation of the shaft 23.5 and the drum 23 can be by an electric motor and is such that the upward and or downward speed of the belt 21 is in the range between 5 to 100 cm/sec. The belt 21 may be built from a suitable chain and horizontal chambers 22 which chambers can be made from pipes, ducts or other horizontal channels. Chambers 22 have large openings 22.2 located on the top when the chambers are moving up in reaction zone 11 and small openings 22.3 for dispersion of the air located opposite to openings 22.2. As chambers 22 move upward in zone 11 they force to rotate the content in reaction zone 11 in the direction shown by arrows 27. At the same time chambers 22 are filled with the reactor mixed liquor and as they pass to the right side on the drum 23 at position 23.3 the content of chambers 22 is emptied via openings 22.2 into the channel 24.4 and the chambers 22 are filled with air. As chambers 22 continue to move downward through channel 24.4 the entrapped air is released via openings 22.3 into the downwardly moving mixed reactor liquor and the dispersed air bubbles move downwardly with the mixed reactor liquor into the aeration zone 24. The velocity of the downwardly moving reactor mixed liquor in channel 24.4 being greater than the rising velocity of the air bubbles, it prevents the air collected in the top portion of the aeration zone 24 to escape via channel 24.4 out from the aeration zone 24 and the air is then continuously redispersed within the aeration zone 24 by the recirculated mixed reactor liquor. In this way energy is not wasted on compression of the delivered air and therefore much less energy is used for aeration of the reactor mixed liquor in the apparatus of this invention than that used in the current art systems.

Since the downward velocity of the reactor mixed liquor in aeration zone 24 drops due to increased crossectional area of the aeration zone 24 the air bubbles tend to remain within the aeration zone 24 until substantially all air oxygen is absorbed into the recirculated reactor mixed liquor. In this way substantially all of the oxygen present in the air delivered into the aeration zone 24 by chambers 22 is used up in the process and therefore none of the energy used for pumping the air is wasted. To control the amount of oxygen dissolved in the reactor mixed liquor a small portion of the air collected in the aeration zone 24 may be bled off via stand pipe 24.5 and valve 24.6. In this way the apparatus of the present invention utilizes much less energy to maintain the biological processes occuring in the reaction tank 10 than the amount of energy used in the current art systems.

As chambers 22 move downward through channel 24.4 they force to flow the sludge from the top of the fluidized bed 12.1 from reaction zone 12 upwardly through channel 24.8, then over the top of partition 10.2 and downwardly through channel 24.4 and aeration zone 24 to the bottom of the reaction tank 10, then upwardly in the direction of arrows 28 through the fluidized bed 12.1. In this way the fluidized sludge solids from the reaction zone 12 are continuously recirculated through the aeration zone 24 and saturated with oxygen required by the biochemical reactions occuring in the fluidized bed 12.1.

The fluidized sludge held in reaction zone 12 filters out all suspended solids present in the treated waste water so that the treated waste water collected in the clear well 12.2 located in reaction zone 12 is clarified and may be discharged via weir 15 and pipe 14 out of the reaction tank 10. The excess sludge accumulates in first reaction zone 11 and may be withdrawn from the reaction tank 10 via opening 17 located in the side wall of the reaction tank 10, pipe 19 and valve 18 continuously to control the removal of phosphorus or periodically if it is desired to reduce the amount of the produced excess sludge. The present invention therefore permits operation of the apparatus and purification of the waste water without the need for a traditional clarifier.

It sould be apparent that an efficient apparatus for biological purification of waste waters can be constructed also without using the throat 50 located in reaction zone 11 to improve the rotation of the reactor mixed liquor therein, or without the standpipe 24.5, or by other modifications of the aeration zone 24, or modification of partition 10.1, partition 10.2 and baffle 24.7. It should be also apparent that the apparatus of the present invention can be combined with any additional treatment step and/or apparatus to further improve the quality of the purified effluent. It is also apparent that the excess sludge if desired can be withdrawn from the aeration zone 24 or from the fluidized bed 12.1. It should be also apparent that a cyclic operation of the apparatus of the present invention is feasible and can be arranged by a single timer switch controlling the operation of the electric motor rotating shaft 23.5.

OPERATION

The operation of the aforedescribed apparatus and the method of the biological treatment used therein consists of the following:

(a) feeding the waste water via inlet 13 into reaction zone 11 of the reaction tank 10, continuously rotating the content in this zone by the multifunctional device 20 and continuously contacting the waste water with the rotating sludge solids in the absence of dissolved oxygen therein, (b) continuously pumping a predetermined volume of the mixed reactor liquor from reaction zone 11 by chambers 22 into the aeration zone 24, mixing the reactor liquor withdrawn from reaction zone 11 with sludge withdrawn from the fluidized bed 12.1 from reaction zone 12 and flowing by gravity a predetermined volume of the mixed liquor with sludge solids from the aeration zone 24 back into the reaction zone 11 via opening 30, (c) continuously recirculating the fluidized sludge from the top of the fluidized bed 12.1 upwardly through channel 24.8 then downwardly through channel 24.4 into the aeration zone 24, then to the bottom of the reaction tank 10 and then upwardly through the fluidized bed 12.1 maintained in reaction zone 12 and contacting the waste water with the fluidized sludge solids in the presence of dissolved oxygen therein, the fluidized sludge solids being composed of suspended solids and microorganisms accumulated in the reaction tank 10 due to processing of the waste water, or the fluidized bed 12.1 composed of powdered minerals, activated carbon and microorganisms as disclosed in my previous invention covered by U.S. Pat. No. 4,167,479 and Can. Pat. No. 1,036,720, or the fluidized bed 12.1 composed of fine wood particles and microorgainsms as disclosed in my other previous invention covered by U.S. Pat. No. 4,188,289 and Can. Pat. No. 1,064,169, (d) continuously pumping air by chambers 22 into the aeration zone 24 and continuously dispersing the air therein into the downwardly recirculating mixed liquor and sludge, (e) continuously accumulating the excess sludge solids in the reaction zone 11 and continuously or periodically withdrawing the excess sludge from the apparatus either from reaction zone 11 or from aeration zone 24 or from fluidized bed 12.1, (f) continuously discharging the purified waste water from the clear well 12.2 via weir 15 and pipe 14 out of the apparatus and continuously flowing the floating solids collected in the clear well 12.2 via openings 24.9 in baffle 24.7 into the aeration zone 24.

It should be apparent to those skilled in the art that the treatment method can be substantially modified by operating the belt 21 in a cyclic "on-off" mode or by modifying the openings in chambers 22 and pumping the mixing liquor from aeration zone 24 into the reaction zone 11.

From the above description of the apparatus and the method of this invention it is evident that the invented apparatus and the adssociated treatment do not require the traditional compressors and air diffusers or surface aerators for aeration of the reactor liquor, do not require the traditional mixers to maintain the biological activity in the denitrifying stages of the treatment in reaction zone 11, do not require the traditional pumps for recirculation of the reactor liquor between the aerobic reaction zone 12 and the anerobic reaction zone 11 and do not require the traditional clarifier, sludge return pumps, sludge scrapers as common in all current art systems. In the described apparatus there is no equipment or parts that can fail and therefore the apparatus and the associated treatment is exceptionally reliable substantially requiring no supervision or maintenance. Because of the simplicity of the invented apparatus the capital and operating costs for the described biological treatment are considerably lower than the costs of all current art systems.

It is also apparent that if further treatment of the clarified effluent is required such can be provided by the existing tertiary treatments.

Having described the preferred embodiment of my invention, it should be apparent to those skilled in the art that the same permits modification in arrangement and detail. I claim as my invention all such modifications as come within the true spirit and scope of the following claims.

I claim:

1. Apparatus for treatment of waste waters including means defining a reaction tank, waste water inlet means for introducing waste water into said reaction tank, endless vertical belt means for mixing, aerating and recirculating the liquid held in said reaction tank, said belt means comprising a pair of endless chain means arranged at opposite sides of said reaction tank, said chain means having a plurality of horizontal pipe means attached to and extending between said chain means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being positioned within said reaction tank with top portion of said belt means located above the top of said reaction tank and the bottom portion of said belt means extending near the bottom of said reaction tank, said belt means being held in position by support means, said support means and said belt means being rotated by motor means, first solid wall partition means positioned inside said belt means, said first partition means being attached to two side walls of said reaction tank and forming with three side walls and the bottom of said reaction tank first reaction zone, second solid partition means positioned in parallel with said first partition means and alongside said belt means, said second partition means being attached to two side walls of said reaction tank and being submerged in the liquid held in said reaction tank and said second partition means extending diagonally into said reaction tank and forming an aeration zone between said first partition means and the two side walls of said reaction tank, and said second partition means forming with three side walls of said reaction tank second reaction zone, said first and second reaction zones being in communication with each other via openings formed by the bottoms of said first and second partition means, said two side walls and the bottom of said reaction tank, said reaction tank containing a fluidized bed of sludge solids located in said second reaction zone, said reaction tank also equipped with a vertical baffle means located in said second reaction zone and positioned in parallel with said second partition means, said vertical baffle means forming between said second partition means and said vertical baffle means a channel means for recirculating sludge from the top of said fluidized bed into said aeration zone and then back into said fluidized bed maintained in said second reaction zone, said vertical baffle means with three side walls of said reaction tank forming a clear well above and in communication with said fluidized bed in said second reaction zone and said vertical baffle means having openings for flowing the floating solids from said clear well back into said aeration zone, said vertical belt means being arranged to pump the sludge solids from the top of said fluidized bed into said aeration zone, to pump and disperse air into the reactor liquor in said aeration zone, to rotate the content in said first reaction zone and to circulate the reactor mixed liquor between said first reaction zone and said aeration zone, and said reaction tank equipped with the effluent discharge means and the excess sludge withdrawal means.

2. Apparatus according to claim 1 and comprising in addition means for disinfection of the effluent.

3. Apparatus according to claim 1 and comprising in addition a timer means for operating said vertical belt means in a cyclic "on-off" mode.

4. A method for treating waste waters comprising mixing the content of a single reaction tank by vertical belt means in three substantially different zones, the first reaction zone being substantially without dissolved oxygen, the second reaction zone being substantially saturated with dissolved oxygen and having a fluidized bed of sludge therein and the aeration zone for dispersing of the air into a downwardly recirculated mixed reactor liquor therein, said vertical belt means comprising a pair of endless chain means arranged at opposite sides of said reaction tank, said chain means having a plurality of horizontal pipe means attached to and extending between said chain means, said pipe means being a chamber having openings located along their length thereof for flowing the reactor liquor out and for entering the air into said pipe means when said pipe means are located above the liquid level of the reactor mixed liquor and for release of the entrapped air from said pipe means through said openings in form of bubbles into said reactor mixed liquor when said pipe means are submerged in said reactor mixed liquor and are moving downwardly in said reaction tank, said belt means being positioned within said reaction tank with top portion of said belt means located above the top of said reaction tank and the bottom portion of said belt means extending near the bottom of said reaction tank, said reaction tank comprising first solid wall partition positioned inside said belt means and attached to two side walls of said reaction tank to form said first reaction zone, second solid wall partition positioned in parallel with said first partition and alongside said belt means and attached to two side walls of said reaction tank and extending diagonally into said reaction tank to form between said first partition and said side walls of said reaction tank said aeration zone, and said second partition forming with side walls of said reaction tank said second reaction zone, said first and second reaction zones being in communication with each other via openings formed by the bottoms of said first and second partitions, said side walls and the bottom of said reaction tank, said reaction tank equipped in addition with a vertical baffle located in said second reaction zone and positioned in parallel with said second partition to form a channel for recirculating sludge from the top of said fluidized bed into said aeration zone and back into said fluidized bed and to form a clear well located above said fluidized bed in said second reaction zone and said reaction tank equipped with effluent discharge means and excess sludge discharge means,

- feeding the waste water into said first reaction zone,
  continuously rotating by said vertical belt means the content therein and contacting the waste water with sludge solids in the absence of dissolved oxygen therein,
- continuously circulating the reactor mixed liquor and sludge by said vertical belt means between said first reaction zone and said aeration zone, and mixing the reactor mixed liquor with sludge withdrawn from said fluidized bed in said aeration zone,
- continuously recirculating the sludge from the top of said fluidized bed from said second reaction zone into said aeration zone, then downwardly to the bottom of said reaction tank then upwardly through said fluidized bed and contacting the waste water with the sludge solids in said aeration zone and then in said fluidized bed in the presence of dissolved oxygen,
- continuously pumping air by said vertical belt means into said aeration zone and continuously dispersing the air into the downwardly recirculated mixed reactor liquor therein,
- withdrawing the excess sludge from said reaction tank,
- continuously flowing the purified waste water through the clear well located above said fluidized bed and out of said reaction tank and continuously flowing the floating solids from said clear well back into said aeration zone.

5. A method according to claim 4 with said excess sludge being withdrawn from said reaction tank periodically.

6. A method according to claim 5 with said vertical belt means operating in a cyclic "on-off" mode.

7. A method according to claim 5 with said fluidized bed comprising of fine wood particles and activated sludge.

8. A method according to claim 7 with said vertical belt means operating in a cyclic "on-off" mode.

9. A method according to claim 5 with said fluidized bed comprising of powdered minerals, activated carbon and activated sludge.

10. A method according to claim 9 with said vertical belt means operating in a cyclic "on-off" mode.

11. A method according to claim 4 with said fluidized bed comprising a mixture of powdered minerals, activated carbon and activated sludge.

12. A method according to claim 4 with said fluidized bed comprising of fine wood particles and activated sludge.

13. A method according to claim 4 with said vertical belt means operating in a cyclic "on-off" mode.

* * * * *